(12) United States Patent
Lundberg (10) Patent No.: US 6,963,375 B1
(45) Date of Patent: Nov. 8, 2005

(54) IMAGE ALTERING DEVICE FOR AN IMAGE PRODUCING APPARATUS

(75) Inventor: Stefan Lundberg, Lund (SE)

(73) Assignee: Axis, AB, Lund (SE)

( * ) Notice: Subject to any disclaimer, the term of this patent is extended or adjusted under 35 U.S.C. 154(b) by 938 days.

(21) Appl. No.: 09/689,181

(22) Filed: Oct. 11, 2000

(30) Foreign Application Priority Data

Jul. 7, 2000 (SE) .................................. 0002554

(51) Int. Cl.[7] ........................................... H04N 5/225
(52) U.S. Cl. .................. 348/335; 348/207.99; 348/36; 348/375; 359/725
(58) Field of Search ................................ 348/335, 340, 348/343, 344, 207.99, 36, 37, 38, 39, 375; 359/213, 214, 215, 877, 876, 696, 725; 250/234, 250/235

(56) References Cited

U.S. PATENT DOCUMENTS

| 4,322,740 A | * | 3/1982 | Takemoto et al. .......... 348/264 |
| 4,933,822 A | * | 6/1990 | NakaMats .................... 362/282 |
| 5,717,512 A | | 2/1998 | Chmielewski, Jr. et al. |
| 5,790,182 A | | 8/1998 | St. Hilaire |
| 5,907,433 A | | 5/1999 | Voigt et al. |
| 5,933,186 A | * | 8/1999 | Ikari et al. ..................... 348/97 |
| 6,118,474 A | * | 9/2000 | Nayar ........................... 348/36 |

FOREIGN PATENT DOCUMENTS

| DE | 9106075.3 | 5/1991 |
| EP | 0452188 A1 | 10/1991 |
| WO | WO 00/57246 | 9/2000 |

* cited by examiner

Primary Examiner—Tuan Ho
Assistant Examiner—Heather R. Long
(74) Attorney, Agent, or Firm—IP Creators; Charles C Cary (57) ABSTRACT

A digital camera has a plurality of fields of view combined with a panning and/or tilting functionality. The camera comprises: a camera housing (6) with an optical input (5), such as a lens or objective. The camera also has an image capturing unit for producing a digital image from light received through the optical input, a controller, a mirror (1) having a first plane surface (12) and a second curved surface (13), and a driving device (7) coupled to the mirror and adapted to rotate the mirror to a first position, where the first plane surface is inserted into an optical path (31) of the digital camera, thereby providing a first field of view of the digital camera. The driving device is also adapted to rotate the mirror to a second position, where the second curved surface is inserted into the optical path of the digital camera, thereby providing a second field of view of the digital camera.

16 Claims, 6 Drawing Sheets

IMAGE ALTERING DEVICE FOR AN IMAGE PRODUCING APPARATUS

RELATED APPLICATION

This application claims priority of prior filed Swedish Application No. 0002554-4 by inventor Stefan Lundberg entitled "An Image Altering Device for an Image Producing Apparatus" filed on Jul. 7, 2000 which is hereby incorporated by reference.

TECHNICAL FIELD

Generally speaking the present invention relates to digital cameras, and more specifically to a digital camera having a camera housing with an optical input, such as a lens or objective, an image capturing unit and a controller. The invention also relates to an image altering device, providing the camera with a panning and/or tilting functionality as well as a functionality for changing the system magnification in fixed steps.

BACKGROUND ART

Camera systems with a wide field of view capability have been in existence for several years. These systems are normally based upon a more or less complex optical system comprising lenses and/or mirrors. In U.S. Pat. No. 5,907,433 to Voigt et. al., a plurality of optical groups are rotatably mounted on a rotary assembly to allow one of the groups to be inserted into the optical path. By using different sets of optical elements a multi-field of view is achieved. One method to obtain panning and/or tilting functionality is described in U.S. Pat. No. 5,717,512 to Chmielewski, Jr. et. al., This invention uses two wide field of view cameras to determine the coordinates of an object, and from that information adjust a rotatable plane pan/tilt mirror to direct light reflected from the object to a narrow field of view camera. Another approach to achieve wide-angle imaging is described in U.S. Pat. No. 5,790,182 to St. Hilaire, where fixed concentric spherical mirrors are used to direct light from an object onto a CCD (Charge Coupled Device) array. By this arrangement the system is capable of capturing an image spanning a 360 degree field of view. No provision is shown for varying the field of view of the device.

SUMMARY OF THE INVENTION

An object of the present invention is to provide a digital camera with a variable field of view combined with a tilting and/or panning functionality, being able to cover a greater visual volume than a conventional panning and/or tilting camera. Furthermore, it is an object of the present invention to provide an image steering and magnification/reduction device (referred to as "image altering device" in the following), to be mounted externally on the digital camera, for providing an efficient way of altering the field of view as well as changing the direction of sight. Another object of the present invention is to provide a simple method and apparatus to filter the light reflected from an object.

In carrying out the above objects and other objects and features of the present invention, the digital camera is provided with an externally mounted image steering and magnification/reduction device comprising a rotary mirror with at least one side having a curved surface. The tilting mirror is rotated within a minor predefined angle with respect to the optical input of the camera to change the direction of sight and by a major predefined angle to alter the field of view or to insert a filter in the optical path. By using a mirror with a curved surface, for a given field of view, the absolute size and weight of the mirror can be reduced, thereby making it possible to increase the rotary speed of the mirror and thus improving the overall speed of which the direction of sight can be changed from a first to a second position. The digital camera also comprises a control unit and an externally mounted driving device for rotating the tilting mirror according to a control signal generated in the control unit.

BRIEF DESCRIPTION OF THE DRAWINGS

A preferred embodiment of the present invention will now be described in more detail, reference being made to the accompanying drawings, in which.

DETAILED DESCRIPTION OF THE PREFERRED EMBODIMENTS

Figure 1:
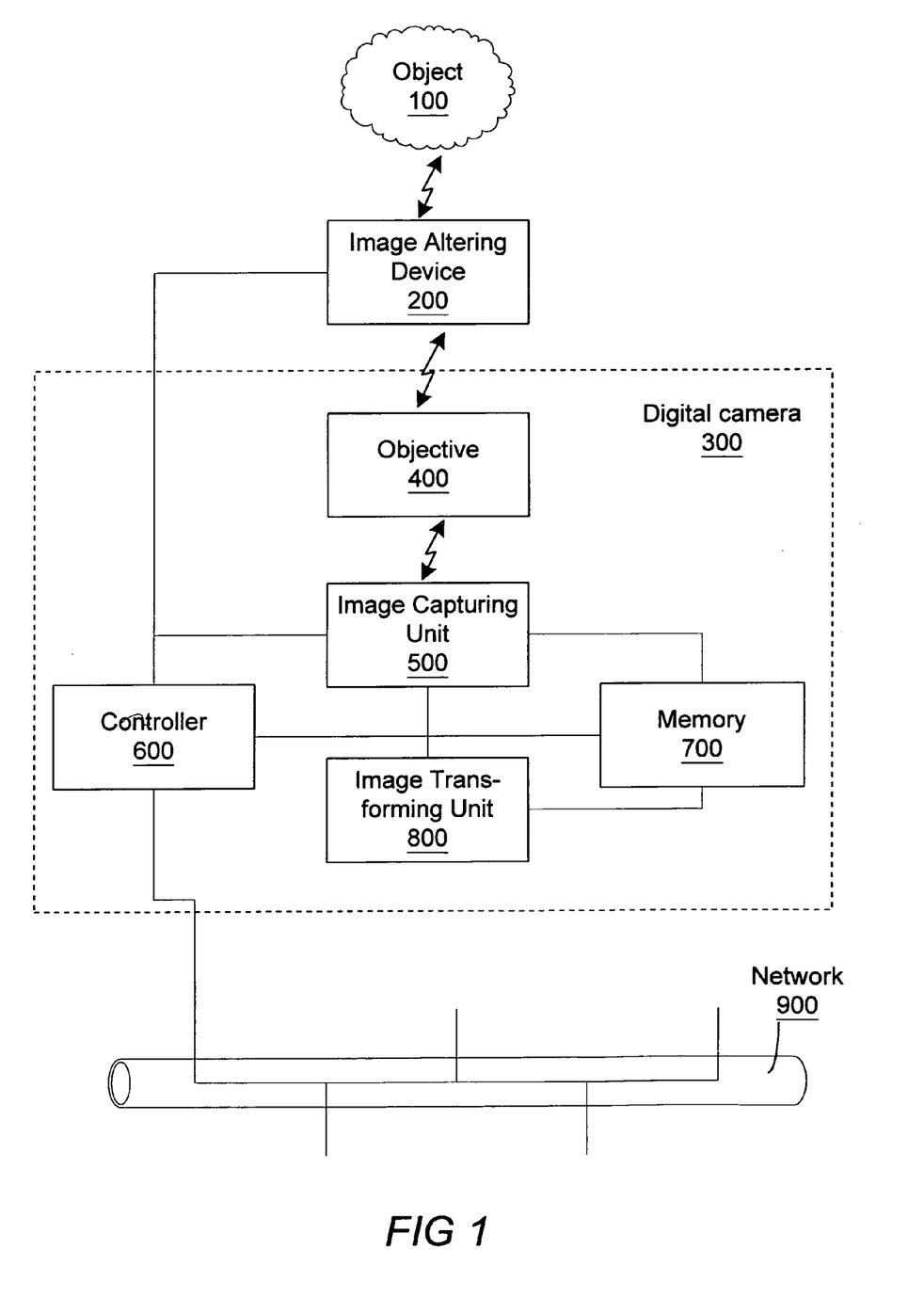
FIG. 1 is a schematic block diagram of the overall structure of a digital camera and an image altering device according to the preferred embodiment.

Referring first to FIG. 1, a digital camera 300 is illustrated in a basic modular form. The digital camera 300 is arranged to produce one or several digital image(s) of a generic object 100, which may be any physical object that is present in a volume optically covered by the digital camera 300. An inventive image altering device 200 is mounted externally to the digital camera 300 in front of an optical input 400 of the digital camera. The optical input 400 is a generally known lens or objective. The purpose of the image altering device 200 is to provide the digital camera 300 with a variable field of view in combination with panning and/or tilting functionality. A preferred embodiment of the image altering device 200 will be described in more detail with reference to FIGS. 2–7.

As shown in FIG. 1, the digital camera 300 further comprises an image capturing unit 500, which is provided with appropriate means for producing a digital image representative of the object 100. Preferably, the image capturing unit 500 comprises a CCD element (Charge Coupled Device), the internal structure of which is believed to be well-known to a man skilled in the art. The digital camera 300 also has a controller 600 for controlling the image capturing unit 500 as well as the external image altering device 200. The controller 600 is operatively connected not only to the device 200 and the unit 500 but also to a digital memory 700 for storing images captured by the image capturing unit 500. Furthermore, the digital camera 300 may comprise an image transforming unit 800, the purpose of which is to rotate the digital image to compensate for image rotating effects caused by the image altering device 200, when the field of view is panned or tilted. The image transforming unit 800 is responsive to an angle of rotation of the image altering device 200 with respect to the objective 400 and uses this angle of rotation when transforming the digital image to compensate for the current pan and/or tilt angle. To perform such image transforming, i.e. to rotate a digital image in one or more than one direction, is believed to be well within reach of a man skilled in the art of digital cameras. Therefore, the internal structure of the image transforming unit 800 will not be described herein.

The memory 700 may be implemented by any commercially available memory, such as an SRAM memory.

As indicated in FIG. 1, the digital camera 300 may be connected to a network 900, such as an Ethernet or Token Ring network, which in turn may be part of the Internet. In such an application, the controller 600 of the digital camera 300 is provided with appropriate software for allowing the digital camera 300 to act as a web camera available on the network 900, i.e. a web server that produces digital images.

The pan and/or tilt angle of the digital camera 300, or more specifically the angle(s) by which the image altering device changes the field of view of the camera 300 with respect to a central axis of the objective 400, may be set and changed by a user of the camera by accessing the controller 600 through the network 900. Alternatively, the pan and/or tilt angle(s) may be controlled from a computer directly connected to the digital camera 300.

Figure 5:
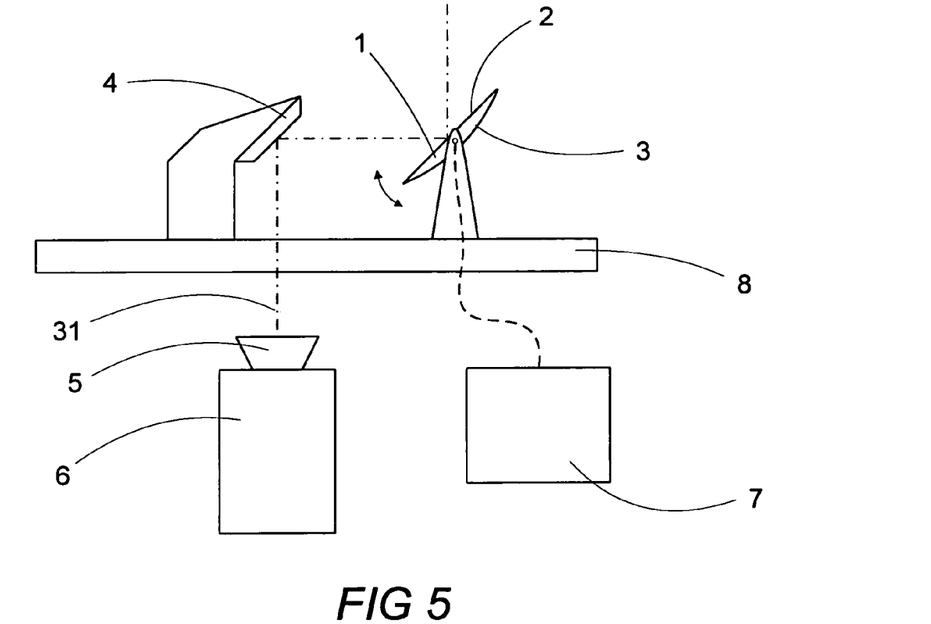
FIG. 5 is a simplified schematic drawing of the main functional parts of the preferred embodiment where the tilting mirror is positioned to achieve a narrow field of view.
Figure 6:
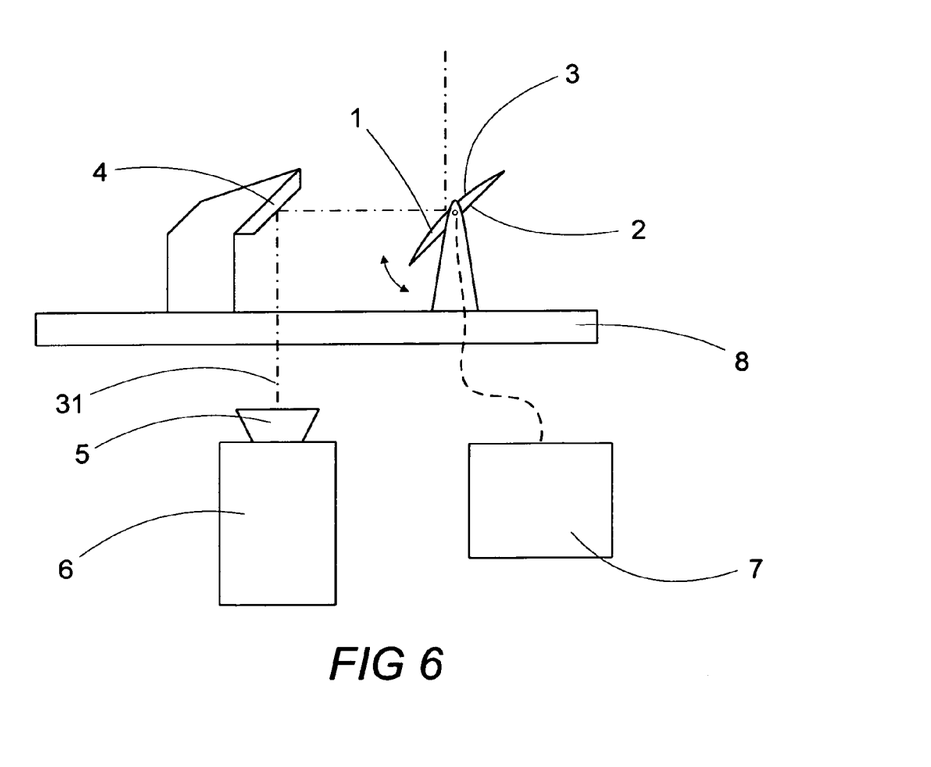
FIG. 6 is a simplified schematic drawing of the main functional parts of the preferred embodiment where the tilting mirror is positioned to achieve a wider field of view.

Referring now to FIGS. 5 and 6, two simplified schematic drawings of the general mirror arrangement and mechanism for altering the image according to a preferred embodiment of the present invention is shown. The image producing apparatus comprises a camera housing 6 and an optical input 5, such as a generally known lens or objective, for producing a digital image representing an object located in the visual volume surrounding the image producing apparatus. The mirror arrangement of the image altering device is located on a base plate 8, externally mounted to the camera.

The image altering device of the invention includes a rotatably mounted tilting mirror 1 and a driving device 7 for rotating the tilting mirror 1 according to a control signal. The driving device 7, in its simplest form, receives a control signal and in response to that either turns the tilting mirror 1 over to change the field of view or rotates the tilting mirror 1 to achieve a panning and/or tilting functionality. In the preferred embodiment, the tilting mirror 1 has a first plane surface 2 and a second curved surface 3. By putting the tilting mirror 1 in the position shown in FIG. 5, the first plane surface 2 is inserted into the optical path 31 of the image producing apparatus, thereby providing the image producing apparatus with a first narrow field of view. This is due to the law of reflection, which terms and theory are well known to those skilled in the art and are thoroughly described in the literature, for instance in chapter 3.4 and 3.7 of "Introduction to Optics", by Frank L. Pedrotti, S. J. and Leno S. Pedrotti, Prentice Hall, Upper Saddle River, N.J. 07458, ISBN 0-13-501545-6. The law of reflection states that the reflected ray remains within the plane of incidence, making equal angles with the normal at the reflection point, in our case, on the mirror surface 2. In a plane mirror, selecting another reflection point does not alter the normal; i.e. an image formed by reflection in a plane surface has got unity magnification.

A fixed mirror 4, mounted directly in front of the objective 5, turns the optical path 31 of the image producing apparatus 6, thereby making it possible to optically cover a volume in the direction of the optical center axis of the objective 5. In the absence of the fixed mirror 4, the rotary mounted tilting mirror 1 would have to be located in a position directly in front of the objective 5 in order to be located in the optical path of the image producing apparatus. The tilting mirror 1 would then block a ray emerging from an object located in the direction of the optical center axis of the objective 5.

FIG. 6 again shows the preferred embodiment, this time with the tilting mirror 1 turned over to achieve a wider field of view. Referring to the discussion above, due to the convex curvature of the mirror surface 3, the law of reflection states that rays of light originating from an object in the optical path of the image producing apparatus will, when they are reflected in a convex surface, diverge in such a way that the magnification of the system will be less than unity.

Figure 7:
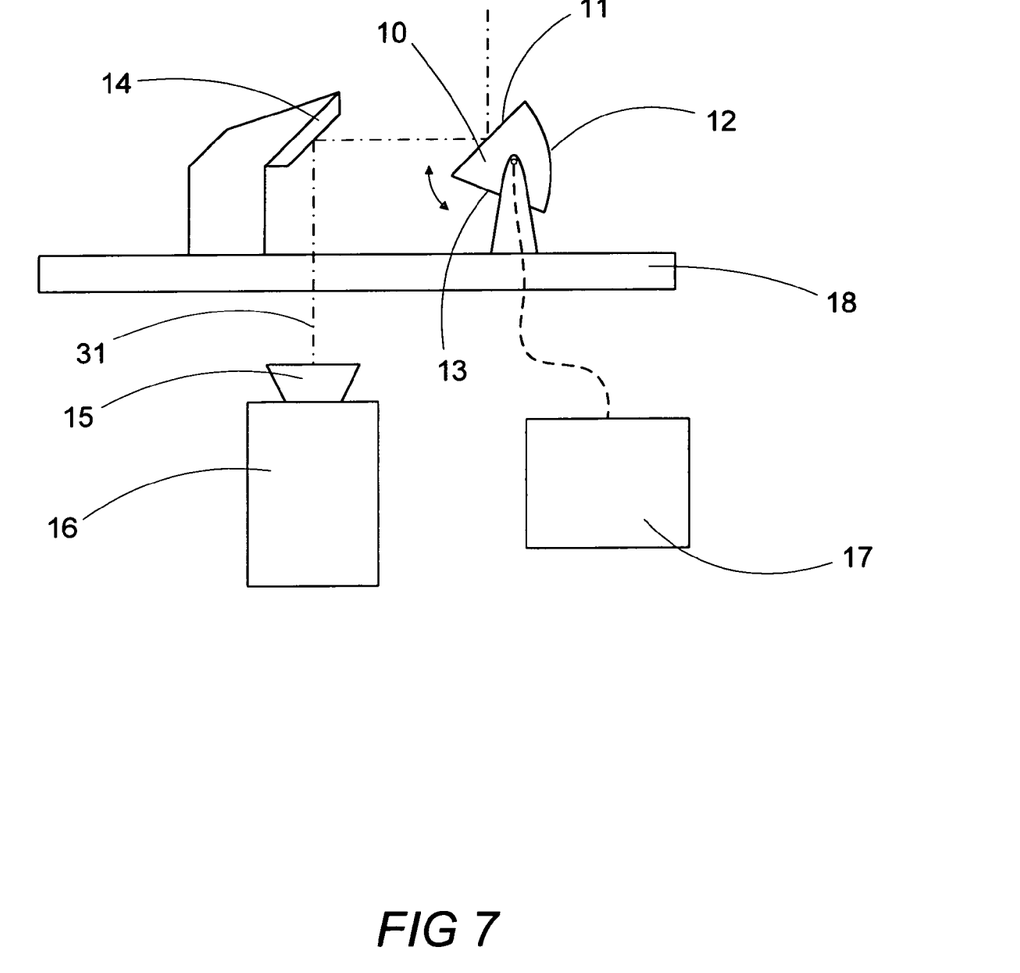
FIG. 7 is a simplified schematic drawing of the main functional parts of a first alternative embodiment.

FIG. 7 shows a simplified schematic drawing of a first alternative embodiment of the present invention. In this embodiment, the rotatably mounted tilting mirror 10 includes, in addition to the first plane surface 11 and the second curved surface 12, a third surface 13 with an optical characteristic different from the first plane surface 11 and/or the second curved surface 12. One conceivable function of this third surface could be to reduce certain spectral components of the reflected light, e.g. to act as a light balancing filter in an indoor environment or to attenuate colors outside the yellow spectral band (approx. 570 nm) to achieve a contrast enhancement. Another conceivable function of this third surface could be to reduce, without distortion, the amount of light reflected from a bright object, located in a highly illuminated environment; i.e. the third surface 13 will act as a gray filter and equally attenuate the spectral components of the reflected light. In this alternative embodiment, the fixed mirror 14, the objective 15, the camera housing 16, the driving device 17 and the base plate 18 are adapted to function according to the corresponding components in FIGS. 5 and 6.

Figure 2:
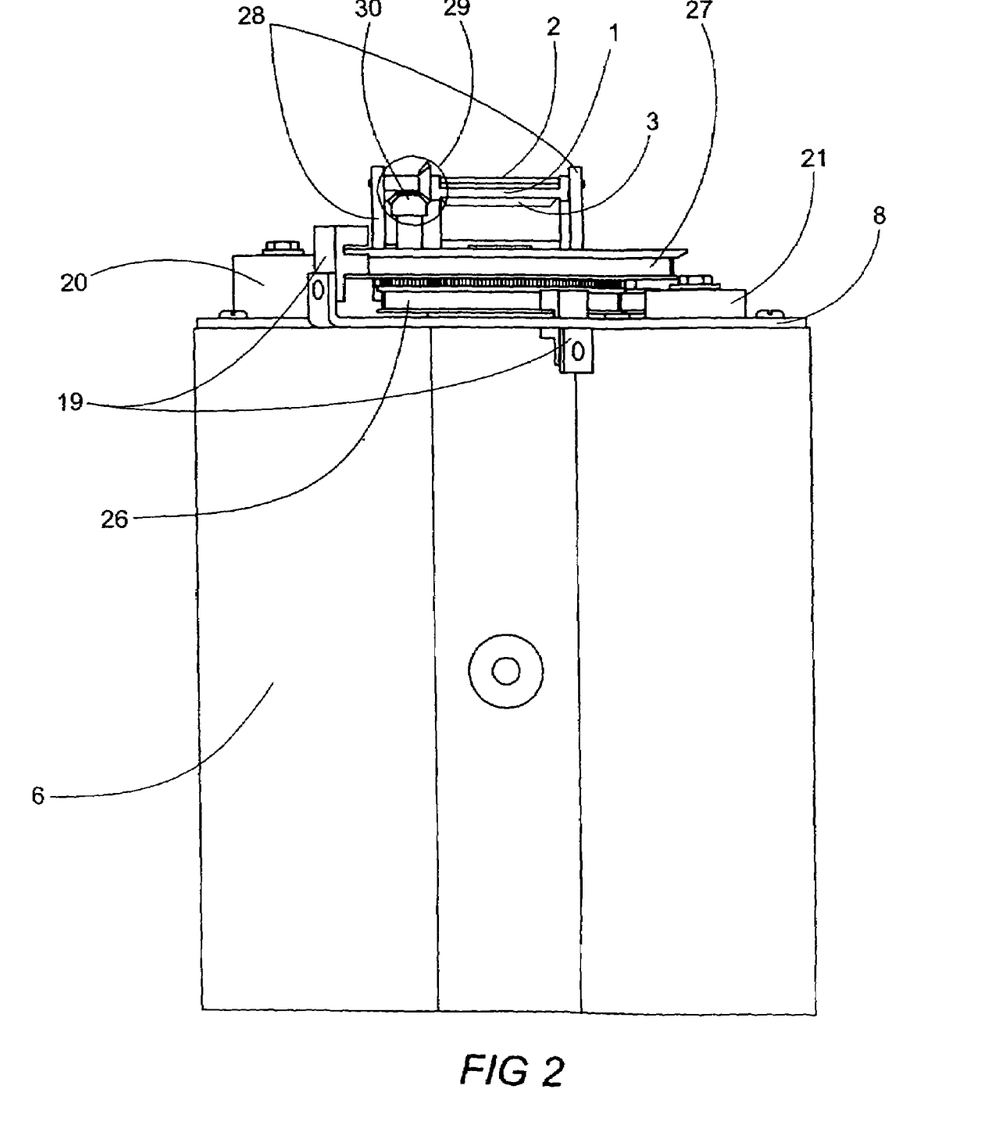
FIG. 2 is a first side view of the image altering device and the camera, to which it is mounted.
Figure 3:
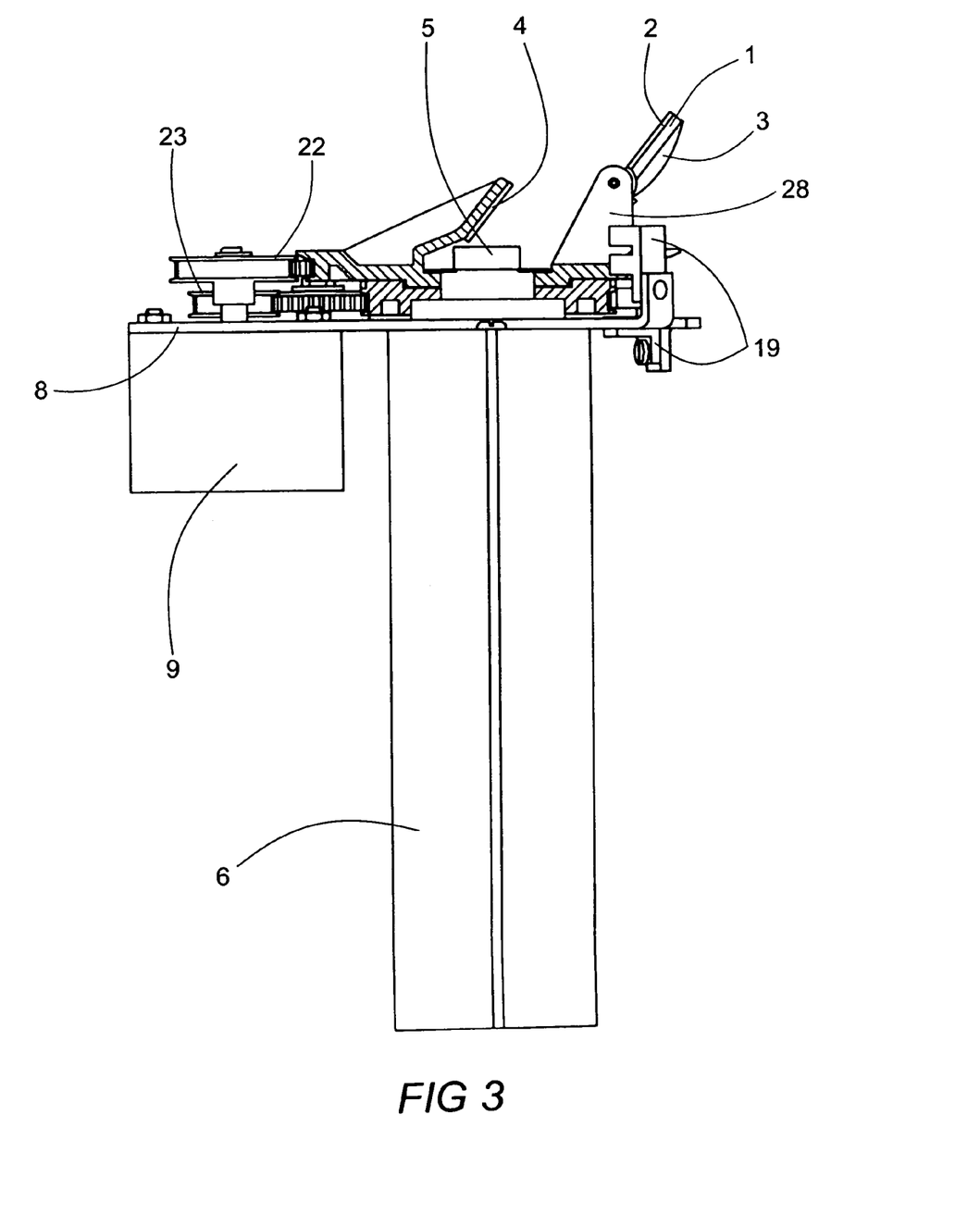
FIG. 3 is a second side view of the image altering device and the camera shown in FIG. 2.
Figure 4:
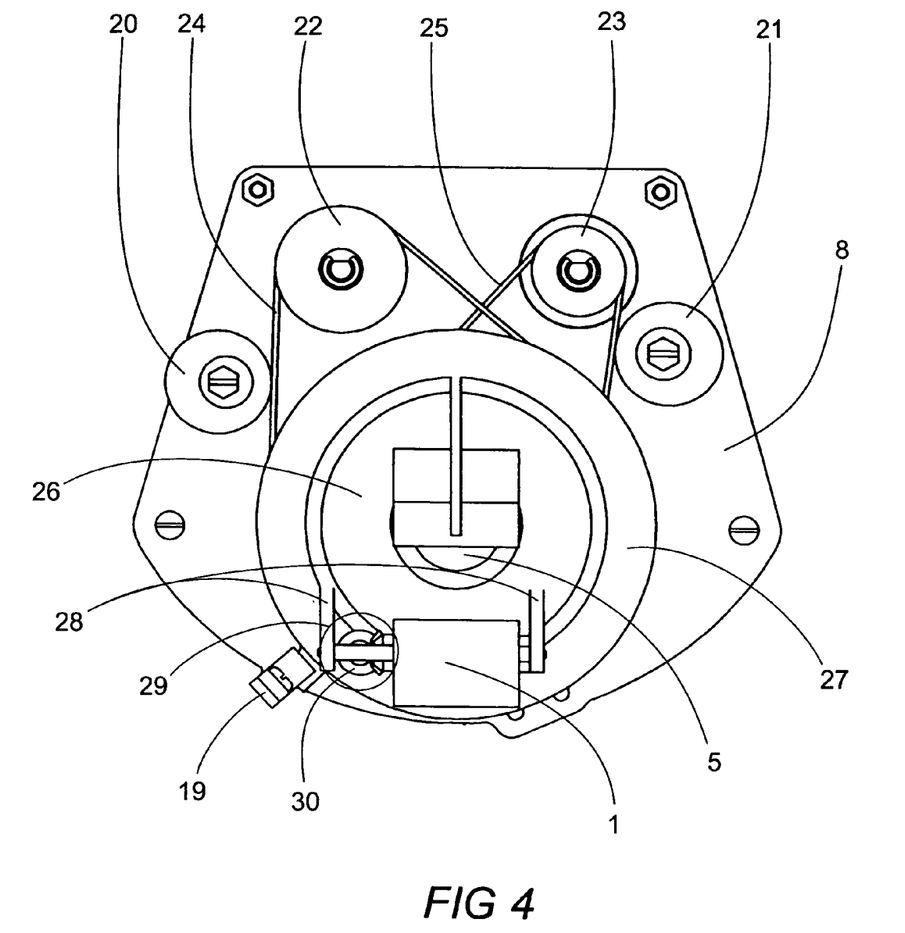
FIG. 4 is a top view of the image altering device shown in FIGS. 2 and 3.

The image altering device 200 will now be described in more detail with reference to FIGS. 2–4. The following elements are shown in these drawings:

| Qty | Ref. No. | Name |
| --- | --- | --- |
| 1 | 1 | Tilting mirror |
| 1 | 2 | First plane surface |
| 1 | 3 | Second curved surface |
| 1 | 4 | Fixed mirror |
| 1 | 5 | Camera lens |
| 1 | 6 | Camera housing |
| 1 | 7 | Driving device |
| 1 | 8 | Base plate |
| 2 | 9 | Motor |
| 1 | 10 | Tilting mirror (alt. embodiment) |
| 1 | 11 | First plane surface (alt. embodiment) |
| 1 | 12 | Second curved surface (alt. embodiment) |
| 1 | 13 | Third surface (alt. embodiment) |
| 1 | 14 | Fixed mirror (alt. embodiment) |
| 1 | 15 | Camera lens (alt. embodiment) |
| 1 | 16 | Camera housing (alt. embodiment) |
| 1 | 17 | Driving device (alt. embodiment) |
| 1 | 18 | Base plate (alt. embodiment) |
| 2 | 19 | Optical sensor |
| 1 | 20 | Timing belt tightener |
| 1 | 21 | Timing belt tightener |

-continued

| Qty | Ref. No. | Name |
| --- | --- | --- |
| 1 | 22 | Belt wheel |
| 1 | 23 | Belt wheel |
| 1 | 24 | Timing belt |
| 1 | 25 | Timing belt |
| 1 | 26 | Guiding wheel |
| 1 | 27 | Mirror wheel |
| 2 | 28 | Fixing part |
| 1 | 29 | Bevel gear |
| 1 | 30 | Tilt shaft |

The image altering device 200 has a mirror system, comprising a first fixed mirror 4 and a second tilting mirror 1. As previously mentioned with reference to FIGS. 5 and 6, the tilting mirror 1 has a first plane surface 2 and a second curved surface 3. The fixed mirror 4 is mounted directly in front of the objective 5 at an angle of 37° relative to the optical center axis of the camera 300. The fixed mirror 4 is mounted to a mirror wheel 27, which is rotatable around the objective and hence provides a field of view with an angle of rotation of between 0° and 360°.

In the center of the field of view the tilting mirror 1 is mounted, so that the axis of rotation thereof is perpendicular to the optical center axis of the camera. The tilting mirror 1 is carried on the mirror wheel 27, thereby causing the tilting mirror 1 to rotate around the objective 5 together with the fixed mirror 4. Thanks to the geometrical arrangement of the mirrors 4 and 1 with respect to the objective 5, it is possible to monitor a large volume in a short time.

The tilting mirror 1 is journalled in the mirror wheel 27 between two fixing parts 28. Opposite to the mirror wheel 27 a slightly smaller guiding wheel 26 is concentrically mounted. A tilt shaft 30 is eccentrically mounted to the mirror wheel, so as to cause the tilting mirror 1 to move. The guiding wheel 26 transmits its motion to the tilt shaft 30 and from the tilt shaft 30 through a bevel gear 29 to the mirror. The arrangement resembles a planetary gear, where the guiding wheel 26 represents a sun pinion and the tilt shaft represents a planet pinion. The mirror wheel 27 acts as holder of the planet pinion.

When the mirror wheel 27 does not move, if the guiding wheel 26 is rotated, the tilt shaft 30 will rotate around its own axis, wherein the tilting mirror 1 will be rotated around its axis of rotation. Hence, the tilting mirror 1 is rotated with respect to the mirror wheel 27, and the center axis of the field of view will be angled with respect to the optical center of the camera. If the mirror wheel 27 and the guiding wheel 26 rotates at the same angular velocity, there will be no relative motion in the tilt shaft 30 and consequently no rotation of the mirror 1 around its axis of rotation. However, the mirror wheel 27 as a whole will rotate with the fixed mirror 4 and the tilting mirror 1 at a constant angle to the optical center axis of the camera.

In other words, by rotating the mirror wheel 27 and the guiding wheel 26 synchronously, the field of view may be rotated 360° for any given tilt angle. Then, if the wheels are rotated relative to each other, the angle of the tilting mirror 1 will change, and the field of view may be again be rotated 360° for a new tilt angle. In this way, a very large volume around the camera may be covered, and images may be obtained for any given location within this large volume. Moreover, by rotating the guiding wheel 26 a certain amount in relation to the mirror wheel 27, the tilting mirror 1 will be turned over at 180°, thereby switching from narrow field of view to wide field of view, or vice versa, as described with reference to FIGS. 5 and 6.

The mirror wheel 27 and the guiding wheel 26 are driven by respective motors 9. Belt wheels 22, 23, timing belts 24, 25 and timing belt tighteners 20, 21 are provided, as shown in FIGS. 2–4.

The inventive image altering device provides at least the following advantages:
Low moment of inertia for rotating parts
High pan/tilt adjustment speed, short time between angular settings
High setting accuracy
Compact design
Few structural components
Low manufacturing cost
Flexible design
Simple pan/tilt control
Multiple fields of view
Filtering and/or other image altering possibilities The present invention has been described above with reference to a preferred embodiment. However, other embodiments than the one disclosed herein are possible within the scope of the invention, as defined by the appended independent patent claims.

What is claimed is:

1. An apparatus for varying a field of view of a camera having a panning mirror rotationally coupled to an objective of the camera for bending an optical input path to align with an optical axis of the objective, and for panning the optical input path about the optical axis, and the improvement comprising:
    a tilt element rotationally coupled to the objective of the camera for concentric rotation aligned with the optical input path of the panning mirror about the optical axis and the tilt element having at least a first optically reflective planar surface and a second optically reflective convex surface displaced from one another arcuately about an axis of rotation of the tilt element; and
    a driving device coupled to the tilt element for driving arcuate rotation of the tilt element about the axis of rotation of the tilt element to effect either a selection of a reflective surface by rotating a corresponding one of at least the first optically reflective planar surface and second optically reflective convex surface into the optical input path of the panning mirror, or a tilting of the selected field of view by tilting about the axis of rotation of the tilt element of a selected one of the at least first and second optically reflective surfaces.

2. The apparatus of claim 1, wherein the second optically reflective convex surface forms a portion of a sphere.

3. The apparatus of claim 1, wherein the first optically reflective planar surface has an angular displacement of 180 degrees with respect to the second optically reflective convex surface.

4. The apparatus of claim 1, wherein further:
    the tilt element including a third optically reflective surface with an optical characteristic different from the first optically reflective planar surface and the second optically reflective convex surface; and
    the driving device for driving arcuate rotation of the tilt element about the axis of rotation of the tilt element to effect a selection of the third optically reflective surface by rotating the third optically reflective surface into the optical input path of the panning mirror.

5. The apparatus of claim 4, wherein the third optically reflective surface defines a plane.

6. The apparatus of claim 4, wherein the third optically reflective surface attenuates selected spectral components of the reflected light.

7. The apparatus of claim 4, wherein the third optically reflective surface uniformly attenuates all spectral components of the reflected light thereby operating as a grey filter.

8. The apparatus of claim 1 wherein the axis of rotation of the tilt element aligns normal to the optical path.

9. A camera having a panning: mirror rotationally coupled to an objective of the camera for bending an optical input path to align with an optical axis of the objective, and for panning the optical input path about the optical axis, and the improvement comprising:
   a tilt element rotationally coupled to the objective of the camera for concentric rotation aligned with the optical input path of the panning mirror about the optical axis and the tilt element having at least a first optically reflective planar surface and a second optically reflective convex surface displaced from one another arcuately about an axis of rotation of the tilt element; and
   a driving device coupled to the tilt element for driving arcuate rotation of the tilt element about the axis of rotation of the tilt element to effect either a selection of a reflective surface by rotating a corresponding one of the first optically reflective planar surface and second optically reflective convex surface into the optical input path of the panning mirror, or a tilting of the selected field of view by tilting about the axis of rotation of the tilt element of a selected one of the at least first and second optically reflective surfaces.

10. The camera of claim 9, wherein the second optically reflective convex surface forms a portion of a sphere.

11. The camera of claim 9, wherein the first optically reflective planar surface has an angular displacement of 180 degrees with respect to the second optically reflective convex surface.

12. The camera of claim 9, wherein further:
   the tilt element including a third optically reflective surface with an optical characteristic different from the first optically reflective planar surface of and the second optically reflective convex surface; and
   the driving device for driving arcuate rotation of the tilt element about the axis of rotation of the tilt element to effect a selection of the third optically reflective surface by rotating the third optically reflective surface into the optical input path of the panning mirror.

13. The camera of claim 12, wherein the third optically reflective surface defines a plane.

14. The camera of claim 12, wherein the third optically reflective surface attenuates selected spectral components of the reflected light.

15. The camera of claim 12, wherein the third optically reflective surface uniformly attenuates all spectral components of the reflected light thereby operating as a grey filter.

16. The camera of claim 9 wherein the axis of rotation of the tilt element aligns normal to the optical path.

\* \* \* \* \*